US010077333B2

(12) United States Patent
Nelson et al.

(10) Patent No.: US 10,077,333 B2
(45) Date of Patent: Sep. 18, 2018

(54) RENEWABLY DERIVED POLYESTERS AND METHODS OF MAKING AND USING THE SAME

(71) Applicant: Elevance Renewable Sciences, Inc., Woodridge, IL (US)

(72) Inventors: Ashley M. Nelson, Blacksburg, VA (US); Keren Zhang, Blacksburg, VA (US); Timothy E. Long, Blacksburg, VA (US); Paul A. Bertin, Western Springs, IL (US)

(73) Assignee: Elevance Renewable Sciences, Inc., Woodridge, IL (US)

( * ) Notice: Subject to any disclaimer, the term of this patent is extended or adjusted under 35 U.S.C. 154(b) by 0 days.

(21) Appl. No.: 15/486,972

(22) Filed: Apr. 13, 2017

(65) Prior Publication Data

US 2017/0313810 A1 Nov. 2, 2017

Related U.S. Application Data

(60) Provisional application No. 62/325,432, filed on Apr. 20, 2016.

(51) Int. Cl.
*C08G 63/06* (2006.01)
(52) U.S. Cl.
CPC .................................. *C08G 63/06* (2013.01)
(58) Field of Classification Search
CPC ............................... C08G 63/06; C08G 63/78
See application file for complete search history.

(56) References Cited

U.S. PATENT DOCUMENTS

| 3,725,442 | A | * | 4/1973 | Marvel | C08F 299/0485 525/450 |
| 3,778,287 | A | * | 12/1973 | Stansfield et al. | C08G 63/06 106/402 |
| 3,778,827 | A | | 12/1973 | Stansfield et al. | |
| 6,297,349 | B1 | * | 10/2001 | Goldberg | C08G 63/08 525/415 |
| 9,034,989 | B2 | * | 5/2015 | Padwa | C08G 63/912 525/190 |

FOREIGN PATENT DOCUMENTS

| WO | 92/19680 | 11/1992 | |
| WO | WO 1992/19680 | * 11/1992 | C08L 3/02 |

OTHER PUBLICATIONS

Kanca, U., et al., Iterative TAndem Catalysis of Racemic AB Monmers, 2008, Journa of Polymer Science: Part A: Polymer Chemistry, vol. 46, pp. 2721-2733 (Year: 2008).*
Knani, D. et al., Enzymatic Polyesterification in organic media. II. Enzyme-catalyst synthesis of lateral-substituted aliphatic polyesters and copolyesters, 1993, Journal of Polymer Science: Part A: Ppolymer Chemistry, vol. 31, pp. 2887-2897 (Year: 1993).*

(Continued)

*Primary Examiner* — Yate' K Cutliff
(74) *Attorney, Agent, or Firm* — Robert S. Dailey

(57) ABSTRACT

Polyester compositions are disclosed herein, as well as methods of making and using such polyesters. In some embodiments, the polyesters are formed from monomers derived from natural oils. In some embodiments, the polyesters have lower glass transition temperatures than polyesters of comparable molecular weight.

17 Claims, 1 Drawing Sheet

(56) References Cited

OTHER PUBLICATIONS

Sugiyama at al., Bull. Chem. Soc. Japan, vol. 40, pp. 2713-14 (1967).
Knani et al., J. Polymer Sci.: Part A, vol. 31, pp. 2887-2897 (1993).
Kanca et al., J. Polymer Sci: Part A, vol. 46, pp. 2721-2733 (2008).
Int'l Search Report & Preliminary Report on Patentability for PCT App. No. PCT/US2017/028222, dated Sep. 22, 2017.

* cited by examiner

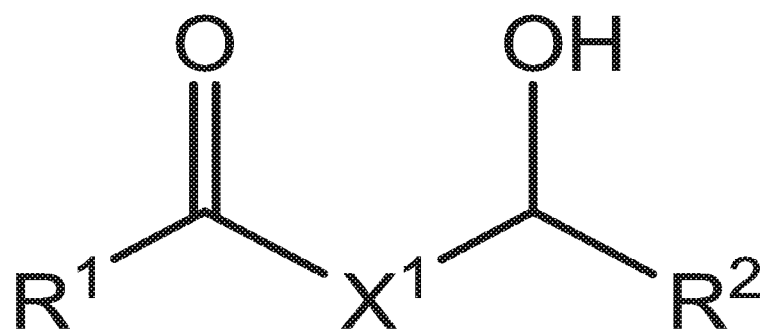

RENEWABLY DERIVED POLYESTERS AND METHODS OF MAKING AND USING THE SAME

CROSS-REFERENCE TO RELATED APPLICATIONS

The present application claims the benefit of priority of U.S. Provisional Application No. 62/325,432, filed Apr. 20, 2016, which is incorporated herein by reference as though set forth herein in its entirety.

TECHNICAL FIELD

Polyester compositions are disclosed herein, as well as methods of making and using such polyesters. In some embodiments, the polyesters are formed from monomers derived from natural oils. In some embodiments, the polyesters have lower glass transition temperatures than polyesters of comparable molecular weight.

BACKGROUND

Polyesters are polymers that contain a plurality of ester linkages. Polyesters are one of the most widely used polymers for commercial applications. In fact, after polyolefins, polyesters are the most widely used polymers for commercial applications. The most commonly used polyester is polyethylene terephthalate (PET). Other commonly used polyesters include polybutylene terephthalate (PBT), polybutylene succinate (PBS), polyethylene adipate (PEA), polycaprolactone (PCL), and polylactic acid (PLA).

In many cases, polyesters are formed from monomers that are derived from refining petroleum products. Such processes generally involve cracking and refining crude petroleum to obtain olefin fragments having a small number of carbon atoms (e.g., two or three carbons). To form longer-chain compounds, the fragments must be reacted to with other such fragments and/or other compounds to form compounds having longer carbon chains. This process is energy-intensive and time-intensive. Further, such processes contribute to the further depletion of non-renewable sources of carbonaceous material.

There are some exceptions, such as polylactic acid (PLA). In fact, PLA has the second highest consumption of any renewably derived polymer in use today. But its use is generally limited to situations where resistance to degradation is not an issue. For example, PLA is widely used in making biodegradable materials, such as medical implants, disposable cups, and the like. But there are a very limited number of polymers made from renewably derived monomers that exhibit chemical and physical characteristics closer to those of more commonly used polyesters.

Refining processes for natural oils (e.g., employing metathesis) can lead to compounds having carbon-chain lengths closer to those generally desired for chemical intermediates of specialty chemicals (e.g., about 9 to 15 carbon atoms). Thus, the refining of natural oils may, in many instances, provide a more chemically efficient and straightforward way to make certain monomers for use in making polymeric species, such as polyesters. Further, because such compounds contain a certain degree of inherent functionality that is otherwise absent from petroleum-sourced materials, it may often be more desirable, if not cheaper, to use natural oils or their derivatives as a starting point for making certain compounds. Additionally, natural oils and their derivatives are generally sourced from renewable feedstocks. Thus, by using such starting materials, one can enjoy the concomitant advantage of developing useful chemical products without consuming limited supplies of petroleum.

Thus, there is a continuing need to discover novel polyesters that are formed using monomers derived from renewable sources, such as natural oils.

SUMMARY

In a first aspect, the disclosure provides polyester polymers, which include constitutional units formed from one of more monomers of Formula (I):

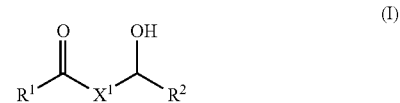

wherein $R^1$ is —OH or —$OR^3$; $R^2$ is $C_{1-6}$ alkyl; $R^3$ is $C_{1-6}$ alkyl or $C_{1-6}$ oxyalkyl; and $X^1$ is $C_{4-10}$ alkylene.

In a second aspect, the disclosure provides a coating composition, the composition including polyester polymers of the first aspect. In some embodiments, the coating composition includes one or more additional polymers. In some such embodiments, the one or more additional polymers have a higher glass transition temperature than the polyester polymers of the first aspect.

In a third aspect, the disclosure provides a personal care composition, the composition including polyester polymers of the first aspect. In some embodiments, the personal care composition includes one or more additional ingredients. Non-limiting examples of personal care compositions include shampoos, hair conditioners, skin moisturizers, hair-styling products, and the like.

Further aspects and embodiments are provided in the foregoing drawings, detailed description and claims.

BRIEF DESCRIPTION OF THE DRAWINGS

The following drawings are provided for purposes of illustrating various embodiments of the compositions and methods disclosed herein. The drawings are provided for illustrative purposes only, and are not intended to describe any preferred compositions or preferred methods, or to serve as a source of any limitations on the scope of the claimed inventions.

FIG. 1 shows a monomer useful for forming constitutional units making up the polyesters disclosed herein, wherein $R^1$ is a hydroxyl group or an ether or polyether functional group, $R^2$ is an alkyl group, and $X^1$ is an alkylene group.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

As used herein, "polymer" refers to a substance having a chemical structure that includes the multiple repetition of constitutional units formed from substances of comparatively low relative molecular mass relative to the molecular mass of the polymer. The term "polymer" includes soluble and/or fusible molecules having chains of repeat units, and also includes insoluble and infusible networks. As used herein, the term "polymer" can include oligomeric materials, which have only a few (e.g., 5-100) constitutional units As used herein, "monomer" refers to a substance that can undergo a polymerization reaction to contribute constitutional units to the chemical structure of a polymer.

As used herein, "copolymer" refers to a polymer having constitutional units formed from more than one species of monomer.

As used herein, "block copolymer" refers to a copolymer having two or more different blocks of polymerized monomers, i.e., different polymer sequences.

As used herein, "polyurethane" refers to a polymer comprising two or more urethane (or carbamate) linkages. Other types of linkages can be included, however. For example, in some instances, the polyurethane or polycarbamate can contain urea linkages, formed, for example, when two isocyanate groups can react. In some other instances, a urea or urethane group can further react to form further groups, including, but not limited to, an allophanate group, a biuret group, or a cyclic isocyanurate group. In some embodiments, at least 70%, or at least 80%, or at least 90%, or at least 95% of the linkages in the polyurethane or polycarbamate are urethane linkages. Further, in the context of a block copolymer, the term "polyurethane block copolymer" refers to a block copolymer, where one or more of the blocks are a polyurethane or a polycarbamate. Other blocks in the "polyurethane block copolymer" may contain few, if any, urethane linkages. For example, in some polyurethane block copolymers, at least one of the blocks is a polyether or a polyester and one or more other blocks are polyurethanes or polycarbamates.

As used herein, "polyester" refers to a polymer comprising two or more ester linkages. Other types of linkages can be included, however. In some embodiments, at least 80%, or at least 90%, or at least 95% of the linkages between monomers in the polyester are ester linkages. The term can refer to an entire polymer molecule, or can also refer to a particular polymer sequence, such as a block within a block copolymer.

As used herein, "natural oil," "natural feedstock," or "natural oil feedstock" refer to oils derived from plants or animal sources. These terms include natural oil derivatives, unless otherwise indicated. The terms also include modified plant or animal sources (e.g., genetically modified plant or animal sources), unless indicated otherwise. Examples of natural oils include, but are not limited to, vegetable oils, algae oils, fish oils, animal fats, tall oils, derivatives of these oils, combinations of any of these oils, and the like. Representative non-limiting examples of vegetable oils include rapeseed oil (canola oil), coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil. Representative non-limiting examples of animal fats include lard, tallow, poultry fat, yellow grease, and fish oil. Tall oils are by-products of wood pulp manufacture. In some embodiments, the natural oil or natural oil feedstock comprises one or more unsaturated glycerides (e.g., unsaturated triglycerides). In some such embodiments, the natural oil feedstock comprises at least 50% by weight, or at least 60% by weight, or at least 70% by weight, or at least 80% by weight, or at least 90% by weight, or at least 95% by weight, or at least 97% by weight, or at least 99% by weight of one or more unsaturated triglycerides, based on the total weight of the natural oil feedstock.

As used herein, "natural oil derivatives" refers to the compounds or mixtures of compounds derived from a natural oil using any one or combination of methods known in the art. Such methods include but are not limited to saponification, fat splitting, transesterification, esterification, hydrogenation (partial, selective, or full), isomerization, oxidation, and reduction. Representative non-limiting examples of natural oil derivatives include gums, phospholipids, soapstock, acidulated soapstock, distillate or distillate sludge, fatty acids and fatty acid alkyl ester (e.g. non-limiting examples such as 2-ethylhexyl ester), hydroxy substituted variations thereof of the natural oil. For example, the natural oil derivative may be a fatty acid methyl ester ("FAME") derived from the glyceride of the natural oil. In some embodiments, a feedstock includes canola or soybean oil, as a non-limiting example, refined, bleached, and deodorized soybean oil (i.e., RBD soybean oil). Soybean oil typically comprises about 95% weight or greater (e.g., 99% weight or greater) triglycerides of fatty acids. Major fatty acids in the polyol esters of soybean oil include saturated fatty acids, as a non-limiting example, palmitic acid (hexadecanoic acid) and stearic acid (octadecanoic acid), and unsaturated fatty acids, as a non-limiting example, oleic acid (9-octadecenoic acid), linoleic acid (9, 12-octadecadienoic acid), and linolenic acid (9,12,15-octadecatrienoic acid).

As used herein, "metathesis catalyst" includes any catalyst or catalyst system that catalyzes an olefin metathesis reaction.

As used herein, "metathesize" or "metathesizing" refer to the reacting of a feedstock in the presence of a metathesis catalyst to form a "metathesized product" comprising new olefinic compounds, i.e., "metathesized" compounds. Metathesizing is not limited to any particular type of olefin metathesis, and may refer to cross-metathesis (i.e., co-metathesis), self-metathesis, ring-opening metathesis, ring-opening metathesis polymerizations ("ROMP"), ring-closing metathesis ("RCM"), and acyclic diene metathesis ("ADMET"). In some embodiments, metathesizing refers to reacting two triglycerides present in a natural feedstock (self-metathesis) in the presence of a metathesis catalyst, wherein each triglyceride has an unsaturated carbon-carbon double bond, thereby forming a new mixture of olefins and esters which may include a triglyceride dimer. Such triglyceride dimers may have more than one olefinic bond, thus higher oligomers also may form. Additionally, in some other embodiments, metathesizing may refer to reacting an olefin, such as ethylene, and a triglyceride in a natural feedstock having at least one unsaturated carbon-carbon double bond, thereby forming new olefinic molecules as well as new ester molecules (cross-metathesis).

As used herein, "olefin" or "olefins" refer to compounds having at least one unsaturated carbon-carbon double bond. In certain embodiments, the term "olefins" refers to a group of unsaturated carbon-carbon double bond compounds with different carbon lengths. Unless noted otherwise, the terms "olefin" or "olefins" encompasses "polyunsaturated olefins" or "poly-olefins," which have more than one carbon-carbon double bond. As used herein, the term "monounsaturated olefins" or "mono-olefins" refers to compounds having only one carbon-carbon double bond. A compound having a terminal carbon-carbon double bond can be referred to as a "terminal olefin" or an "alpha-olefin," while an olefin having a non-terminal carbon-carbon double bond can be referred to as an "internal olefin." In some embodiments, the alpha-olefin is a terminal alkene, which is an alkene (as defined below) having a terminal carbon-carbon double bond. Additional carbon-carbon double bonds can be present.

The number of carbon atoms in any group or compound can be represented by the terms: "$C_z$", which refers to a group of compound having z carbon atoms; and "$C_{x-y}$", which refers to a group or compound containing from x to y, inclusive, carbon atoms. For example, "$C_{1-6}$ alkyl" represents an alkyl chain having from 1 to 6 carbon atoms and, for example, includes, but is not limited to, methyl, ethyl, n-propyl, isopropyl, isobutyl, n-butyl, sec-butyl, tert-butyl, isopentyl, n-pentyl, neopentyl, and n-hexyl. As a further example, a "$C_{4-10}$ alkene" refers to an alkene molecule having from 4 to 10 carbon atoms, and, for example, includes, but is not limited to, 1-butene, 2-butene, isobutene, 1-pentene, 1-hexene, 3-hexene, 1-heptene, 3-heptene, 1-octene, 4-octene, 1-nonene, 4-nonene, and 1-decene.

As used herein, the term "low-molecular-weight olefin" may refer to any one or combination of unsaturated straight, branched, or cyclic hydrocarbons in the $C_{2-14}$ range. Low-molecular-weight olefins include alpha-olefins, wherein the unsaturated carbon-carbon bond is present at one end of the compound. Low-molecular-weight olefins may also include dienes or trienes. Low-molecular-weight olefins may also include internal olefins or "low-molecular-weight internal olefins." In certain embodiments, the low-molecular-weight internal olefin is in the $C_{4-14}$ range. Examples of low-molecular-weight olefins in the $C_{2-6}$ range include, but are not limited to: ethylene, propylene, 1-butene, 2-butene, isobutene, 1-pentene, 2-pentene, 3-pentene, 2-methyl-1-butene, 2-methyl-2-butene, 3-methyl-1-butene, cyclopentene, 1,4-pentadiene, 1-hexene, 2-hexene, 3-hexene, 4-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, and cyclohexene. Non-limiting examples of low-molecular-weight olefins in the $C_{7-9}$ range include 1,4-heptadiene, 1-heptene, 3,6-nonadiene, 3-nonene, 1,4,7-octatriene. Other possible low-molecular-weight olefins include styrene and vinyl cyclohexane. In certain embodiments, it is preferable to use a mixture of olefins, the mixture comprising linear and branched low-molecular-weight olefins in the $C_{4-10}$ range. Olefins in the $C_{4-10}$ range can also be referred to as "short-chain olefins," which can be either branched or unbranched. In one embodiments, it may be preferable to use a mixture of linear and branched $C_4$ olefins (i.e., combinations of: 1-butene, 2-butene, and/or isobutene). In other embodiments, a higher range of $C_{11-14}$ may be used.

In some instances, the olefin can be an "alkene," which refers to a straight- or branched-chain non-aromatic hydrocarbon having 2 to 30 carbon atoms and one or more carbon-carbon double bonds, which may be optionally substituted, as herein further described, with multiple degrees of substitution being allowed. A "monounsaturated alkene" refers to an alkene having one carbon-carbon double bond, while a "polyunsaturated alkene" refers to an alkene having two or more carbon-carbon double bonds. A "lower alkene," as used herein, refers to an alkene having from 2 to 10 carbon atoms.

As used herein, "ester" or "esters" refer to compounds having the general formula: R—COO—R', wherein R and R' denote any organic group (such as alkyl, aryl, or silyl groups) including those bearing heteroatom-containing substituent groups. In certain embodiments, R and R' denote alkyl, alkenyl, aryl, or alcohol groups. In certain embodiments, the term "esters" may refer to a group of compounds with the general formula described above, wherein the compounds have different carbon lengths. In certain embodiments, the esters may be esters of glycerol, which is a trihydric alcohol. The term "glyceride" can refer to esters where one, two, or three of the —OH groups of the glycerol have been esterified.

It is noted that an olefin may also comprise an ester, and an ester may also comprise an olefin, if the R or R' group in the general formula R—COO—R' contains an unsaturated carbon-carbon double bond. Such compounds can be referred to as "unsaturated esters" or "olefin ester" or "olefinic ester compounds." Further, a "terminal olefinic ester compound" may refer to an ester compound where R has an olefin positioned at the end of the chain. An "internal olefin ester" may refer to an ester compound where R has an olefin positioned at an internal location on the chain. Additionally, the term "terminal olefin" may refer to an ester or an acid thereof where R' denotes hydrogen or any organic compound (such as an alkyl, aryl, or silyl group) and R has an olefin positioned at the end of the chain, and the term "internal olefin" may refer to an ester or an acid thereof where R' denotes hydrogen or any organic compound (such as an alkyl, aryl, or silyl group) and R has an olefin positioned at an internal location on the chain.

As used herein, "alcohol" or "alcohols" refer to compounds having the general formula: R—OH, wherein R denotes any organic moiety (such as alkyl, aryl, or silyl groups), including those bearing heteroatom-containing substituent groups. In certain embodiments, R denotes alkyl, alkenyl, aryl, or alcohol groups. In certain embodiments, the term "alcohol" or "alcohols" may refer to a group of compounds with the general formula described above, wherein the compounds have different carbon lengths. The term "hydroxyl" refers to a —OH moiety. In some cases, an alcohol can have two or more hydroxyl groups. As used herein, "diol" refers to alcohols having two or more hydroxyl groups.

As used herein, "carboxylic acid" or "carboxylic acids" refer to compounds having the general formula: R—C(O)—OH, wherein R denotes any organic moiety (such as alkyl, aryl, or silyl groups), including those bearing heteroatom-containing substituent groups. In certain embodiments, R denotes alkyl, alkenyl, aryl, or alcohol groups. In certain embodiments, the term "carboxylic acid" or "carboxylic acids" may refer to a group of compounds with the general formula described above, wherein the compounds have different carbon lengths. The term "carboxyl" refers to a —C(O)OH moiety. In some cases, a carboxylic acid can have two or more hydroxyl groups. As used herein, "dicarboxylic acid" and "diacid" refer to carboxylic acids having two or more carboxyl groups.

As used herein, "hydroxy acid" or "hydroxy acids" refer to compounds having the general formula: HO—R—C(O)—OH, wherein R denotes any organic moiety (such as alkyl, aryl, or silyl groups), including those bearing heteroatom-containing substituent groups. In certain embodiments, R denotes alkyl, alkenyl, aryl, or alcohol groups. In certain embodiments, the term "hydroxy acid" or "hydroxy acids" may refer to a group of compounds with the general formula described above, wherein the compounds have different carbon lengths.

As used herein, "alkyl" refers to a straight or branched chain saturated hydrocarbon having 1 to 30 carbon atoms, which may be optionally substituted, as herein further described, with multiple degrees of substitution being allowed. Examples of "alkyl," as used herein, include, but are not limited to, methyl, ethyl, n-propyl, isopropyl, isobutyl, n-butyl, sec-butyl, tert-butyl, isopentyl, n-pentyl, neopentyl, n-hexyl, and 2-ethylhexyl. The number of carbon atoms in an alkyl group is represented by the phrase "$C_{x-y}$ alkyl," which refers to an alkyl group, as herein defined, containing from x to y, inclusive, carbon atoms. Thus, "$C_{1-6}$ alkyl" represents an alkyl chain having from 1 to 6 carbon atoms and, for example, includes, but is not limited to, methyl, ethyl, n-propyl, isopropyl, isobutyl, n-butyl, sec-butyl, tert-butyl, isopentyl, n-pentyl, neopentyl, and n-hexyl. In some instances, the "alkyl" group can be divalent, in which case the group can alternatively be referred to as an "alkylene" group. Also, in some instances, one or more of the carbon atoms in the alkyl or alkylene group can be replaced by a heteroatom (e.g., selected from nitrogen, oxygen, or sulfur, including N-oxides, sulfur oxides, and sulfur dioxides, where feasible), and is referred to as a "heteroalkyl" or "heteroalkylene" group, respectively. Non-limiting examples include "oxyalkyl" or "oxyalkylene" groups, which include groups of the following formulas: -[-(alkylene)-O—]$_x$-alkyl, -[-(alkylene)-O—]$_x$-alkylene-, respectively, where x is 1 or more, such as 1, 2, 3, 4, 5, 6, 7, or 8.

As used herein, "substituted" refers to substitution of one or more hydrogen atoms of the designated moiety with the named substituent or substituents, multiple degrees of substitution being allowed unless otherwise stated, provided that the substitution results in a stable or chemically feasible compound. A stable compound or chemically feasible compound is one in which the chemical structure is not substantially altered when kept at a temperature from about −80° C. to about +40° C., in the absence of moisture or other chemically reactive conditions, for at least a week. As used herein, the phrases "substituted with one or more . . . " or "substituted one or more times . . . " refer to a number of substituents that equals from one to the maximum number of substituents possible based on the number of available bonding sites, provided that the above conditions of stability and chemical feasibility are met.

As used herein, "mix" or "mixed" or "mixture" refers broadly to any combining of two or more compositions. The two or more compositions need not have the same physical state; thus, solids can be "mixed" with liquids, e.g., to form a slurry, suspension, or solution. Further, these terms do not require any degree of homogeneity or uniformity of composition. This, such "mixtures" can be homogeneous or heterogeneous, or can be uniform or non-uniform. Further, the terms do not require the use of any particular equipment to carry out the mixing, such as an industrial mixer.

As used herein, "optionally" means that the subsequently described event(s) may or may not occur. In some embodiments, the optional event does not occur. In some other embodiments, the optional event does occur one or more times.

As used herein, "comprise" or "comprises" or "comprising" or "comprised of" refer to groups that are open, meaning that the group can include additional members in addition to those expressly recited. For example, the phrase "comprises A" means that A must be present, but that other members can be present too. The terms "include," "have," and "composed of" and their grammatical variants have the same meaning. In contrast, "consist of" or "consists of" or "consisting of" refer to groups that are closed. For example, the phrase "consists of A" means that A and only A is present.

As used herein, "or" is to be given its broadest reasonable interpretation, and is not to be limited to an either/or construction. Thus, the phrase "comprising A or B" means that A can be present and not B, or that B is present and not A, or that A and B are both present. Further, if A, for example, defines a class that can have multiple members, e.g., $A_1$ and $A_2$, then one or more members of the class can be present concurrently.

As used herein, the various functional groups represented will be understood to have a point of attachment at the functional group having the hyphen or dash (-) or an asterisk (*). In other words, in the case of —CH$_2$CH$_2$CH$_3$, it will be understood that the point of attachment is the CH$_2$ group at the far left. If a group is recited without an asterisk or a dash, then the attachment point is indicated by the plain and ordinary meaning of the recited group.

As used herein, multi-atom bivalent species are to be read from left to right. For example, if the specification or claims recite A-D-E and D is defined as —OC(O)—, the resulting group with D replaced is: A-OC(O)-E and not A-C(O)O-E.

Other terms are defined in other portions of this description, even though not included in this subsection.

Polyester Polymers

In certain aspects, the disclosure provides polyester polymers, which include constitutional units formed from a reaction mixture comprising one of more monomers of Formula (I):

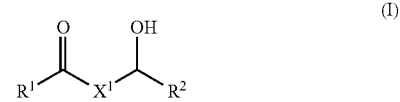

wherein $R^1$ is —OH or —OR$^3$; $R^2$ is $C_{1-6}$ alkyl; $R^3$ is $C_{1-6}$ alkyl or $C_{1-6}$ oxyalkyl; and $X^1$ is $C_{4-10}$ alkylene.

In some embodiments of any of the aforementioned embodiments, $R^1$ is —OH. In some other embodiments, $R^1$ is —OR$^3$. In some such embodiments, $R^3$ is methyl, ethyl, or isopropyl. In some further such embodiments, $R^3$ is methyl.

In some embodiments of any of the aforementioned embodiments, $R^2$ is methyl, ethyl, or n-propyl.

In some embodiments of any of the aforementioned embodiments, $X^1$ is $-(CH_2)_5-$, $-(CH_2)_6-$, or $-(CH_2)_7-$.

In some embodiments of any of the aforementioned embodiments, $R^2$ is methyl and $X^1$ is $-(CH_2)_7-$.

In some embodiments of any of the aforementioned embodiments, $R^2$ is ethyl and $X^1$ is $-(CH_2)_6-$.

In some embodiments of any of the aforementioned embodiments, $R^2$ is n-propyl and $X^1$ is $-(CH_2)_5-$.

In some embodiments of any of the aforementioned embodiments, the polyester polymer includes constitutional units formed from at least two monomers selected from the group consisting of: a first monomer, a second monomer, and a third monomer, wherein: the first monomer is a compound of Formula (I) where $R^2$ is methyl and $X^1$ is $-(CH_2)_7-$; the second monomer is a compound of Formula (I) where $R^2$ is ethyl and $X^1$ is $-(CH_2)_6-$; and the third monomer is a compound of Formula (I) where $R^2$ is n-propyl and $X^1$ is $-(CH_2)_5-$. In some such embodiments, the polyester polymer includes constitutional units formed from the first monomer and the second monomer. In some such embodiments, the polyester polymer includes constitutional units formed from the first monomer and the third monomer. In some such embodiments, the polyester polymer includes constitutional units formed from the second monomer and the third monomer. In some such embodiments, the polyester polymer includes constitutional units formed from the first monomer, the second monomer, and the third monomer.

In embodiments where the polyester polymer includes constitutional units formed from two or more different compounds of formula (I), the different monomers can exist in any suitable ratio. For example, in embodiments where the polyester polymer includes constitutional units formed from the first monomer, the second monomer, and the third monomer (according to the embodiments in the preceding paragraph), the weight-weight ratio of the first monomer to the second and third monomers (collectively) ranges from 1:3 to 10:1, or from 1:1 to 5:1. In some embodiments, the weight-weight ratio of the first monomer to the second and third monomers (collectively) is about 1:2.

The polyester polymers disclosed herein can have any suitable type. In some embodiments of any of the aforementioned embodiments, the polyester polymer is an AB-type polymer.

The polyester polymers disclosed herein can have any suitable molecular weight. In some embodiments, the polyester polymers have a number-average molecular weight ranging from 1,000 Da to 50,000 Da, or from 1,000 Da to 40,000 Da, or from 1,000 Da to 30,000 Da, or from 2,000 Da to 20,000 Da.

The polyester polymers disclosed herein can have any suitable glass transition temperature ($T_g$). For example, in some embodiments, the polyester polymers have a glass transition temperature no greater than −20° C., or no greater than −30° C., or no greater than −40° C., or no greater than −45° C., or no greater than −50° C., or no greater than −55° C., or no greater than −60° C.

The polyester polymers disclosed herein can have any suitable physical properties. In some embodiments, the polyester polymer is a thermoplastic polymer. In some embodiments, the polyester polymer is an amorphous polymer. In some embodiments, the polyester polymer is biodegradable.

The polyester polymers can include any additional constitutional units formed from other monomers, such as diols, dicarboxylic acids (diacids) or esters thereof, and/or hydroxyl acids or esters thereof. In some embodiments of any of the aforementioned embodiments, the reaction mixture further comprises one or more diols. In some embodiments, the one or more diols are selected from the group consisting of ethylene glycol, 1,2-propylene glycol, 1,3-propylene glycol, 1,4-butanediol, 2,3-butanediol, 1,5-pentanediol, 1,6-hexanediol, 1,8-octanediol, 2-methyl-1,3-propanediol, 2-butyl-2-ethyl-1,3-propanediol, and neopentyl glycol. In some embodiments of any of the aforementioned embodiments, the reaction mixture further comprises constitutional units formed from one or more diacids, or esters thereof (such as $C_{1-6}$ alkyl esters, e.g., dimethyl esters). In some embodiments, the one or more diacids, or esters thereof, are selected from the group consisting of oxalic acid, malonic acid, succinic acid, glutaric acid, adipic acid, pimelic acid, suberic acid, azelaic acid, sebacic acid, 1,12-dodecanedioic acid, 1,14-tetradecanedioic acid, 1,16-hexadecanedioic acid, 1,18-octadecanedioic acid, 1,20-eicosanedioic acid, 1,22-docosanedioic acid, 1,18-octadec-9-enedioic acid, and esters of any of the foregoing. In some embodiments of any of the foregoing embodiments, the reaction mixture further comprises one or more hydroxy acids, or esters thereof. In some embodiments, the one or more hydroxy acids, or esters thereof, are selected from the group consisting of α-hydroxy acids (such as glycolic acid, lactic acid, malic acid, citric acid, tartaric acid, and the like), β-hydroxy acids (such as 3-hydroxypropionic acid, 3-hydroxybutanoic acid, 3-hydroxy-3-methylbutanoic acid, and the like), ω-hydroxy acids (such as 16-hydroxypalmitic acid, 18-hydroxystearic acid, and the like), and esters of any of the foregoing.

The polyester polymers disclosed herein can include certain additives that may play a role in tuning the properties. For example, in some embodiments, the reaction mixture further comprises one or more branching agents. In some embodiments, the reaction mixture further comprises one or more cross-linking agents.

Compositions Including the Polyester Polymers

The aforementioned polyester polymers can be included in any suitable compositions, such as coating compositions, personal care compositions, and adhesive compositions.

For example, in certain aspects and embodiments, the disclosure provides coating compositions that include polyester polymers of any of the foregoing embodiments. Such coating compositions can include any additional additives and polymers, such as are commonly included in coating compositions, such as pigments, coalescents, additional resins, and the like. The coating compositions can be suitable for coating any suitable surface, including, but not limited to, plastic, metal, wood, stone, concrete, glass, and the like.

In certain other aspects and embodiments, the disclosure provides personal care compositions that include polyester polymers of any of the foregoing embodiments. Such personal care compositions can include any additional additives and polymers, such as are commonly included in personal care compositions, such as hydrocarbons, waxes, glyceride esters, surfactants, and the like.

In certain other aspects and embodiments, the disclosure provides adhesive compositions that include polyester polymers of any of the foregoing embodiments. Such adhesive compositions can include any additional additives and polymers, such as are commonly included in adhesive compositions, such as tackifiers, waxes, rosin oils, and the like.

Block Copolymers

In certain aspects and embodiments, the disclosure provides certain block copolymers in which the polyester polymers of any of the foregoing embodiments can serve as one of the blocks in the block copolymer. Any suitable block copolymers can be formed, including, but not limited to, diblock copolymers, triblock copolymers, and the like. In addition to the polyester block the other block(s) can include any suitable polymeric chain. For example, in some embodiments, the block copolymer comprises a second block that includes polycaprolactone. In some other embodiments, the block copolymer comprises a second block that includes a polycarbamate. In some such embodiments, the block copolymer is a thermoplastic polyurethane (TPU). In some other embodiments, the block copolymer comprises a second block that includes another polyester. In some other embodiments, the block copolymer comprises a second block that includes a polyamide. In some other embodiments, the block copolymer comprises a second block that includes a polyamide ester. In some embodiments of any of the aforementioned embodiments, the block copolymer is biodegradable.

Derivation from Renewable Sources

The compounds employed in any of the aspects or embodiments disclosed herein can, in certain embodiments, be derived from renewable sources, such as from various natural oils or their derivatives. Any suitable methods can be used to make these compounds from such renewable sources. Suitable methods include, but are not limited to, fermentation, conversion by bioorganisms, and conversion by metathesis.

Olefin metathesis provides one possible means to convert certain natural oil feedstocks into olefins and esters that can be used in a variety of applications, or that can be further modified chemically and used in a variety of applications. In some embodiments, a composition (or components of a composition) may be formed from a renewable feedstock, such as a renewable feedstock formed through metathesis reactions of natural oils and/or their fatty acid or fatty ester derivatives. When compounds containing a carbon-carbon double bond undergo metathesis reactions in the presence of a metathesis catalyst, some or all of the original carbon-carbon double bonds are broken, and new carbon-carbon double bonds are formed. The products of such metathesis reactions include carbon-carbon double bonds in different locations, which can provide unsaturated organic compounds having useful chemical properties.

A wide range of natural oils, or derivatives thereof, can be used in such metathesis reactions. Examples of suitable natural oils include, but are not limited to, vegetable oils, algae oils, fish oils, animal fats, tall oils, derivatives of these oils, combinations of any of these oils, and the like. Representative non-limiting examples of vegetable oils include rapeseed oil (canola oil), coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil. Representative non-limiting examples of animal fats include lard, tallow, poultry fat, yellow grease, and fish oil. Tall oils are by-products of wood pulp manufacture. In some embodiments, the natural oil or natural oil feedstock comprises one or more unsaturated glycerides (e.g., unsaturated triglycerides). In some such embodiments, the natural oil feedstock comprises at least 50% by weight, or at least 60% by weight, or at least 70% by weight, or at least 80% by weight, or at least 90% by weight, or at least 95% by weight, or at least 97% by weight, or at least 99% by weight of one or more unsaturated triglycerides, based on the total weight of the natural oil feedstock.

The natural oil may include canola or soybean oil, such as refined, bleached and deodorized soybean oil (i.e., RBD soybean oil). Soybean oil typically includes about 95 percent by weight (wt %) or greater (e.g., 99 wt % or greater) triglycerides of fatty acids. Major fatty acids in the polyol esters of soybean oil include but are not limited to saturated fatty acids such as palmitic acid (hexadecanoic acid) and stearic acid (octadecanoic acid), and unsaturated fatty acids such as oleic acid (9-octadecenoic acid), linoleic acid (9,12-octadecadienoic acid), and linolenic acid (9,12,15-octadecatrienoic acid).

Metathesized natural oils can also be used. Examples of metathesized natural oils include but are not limited to a metathesized vegetable oil, a metathesized algal oil, a metathesized animal fat, a metathesized tall oil, a metathesized derivatives of these oils, or mixtures thereof. For example, a metathesized vegetable oil may include metathesized canola oil, metathesized rapeseed oil, metathesized coconut oil, metathesized corn oil, metathesized cottonseed oil, metathesized olive oil, metathesized palm oil, metathesized peanut oil, metathesized safflower oil, metathesized sesame oil, metathesized soybean oil, metathesized sunflower oil, metathesized linseed oil, metathesized palm kernel oil, metathesized tung oil, metathesized jatropha oil, metathesized mustard oil, metathesized camelina oil, metathesized pennycress oil, metathesized castor oil, metathesized derivatives of these oils, or mixtures thereof. In another example, the metathesized natural oil may include a metathesized animal fat, such as metathesized lard, metathesized tallow, metathesized poultry fat, metathesized fish oil, metathesized derivatives of these oils, or mixtures thereof.

Such natural oils, or derivatives thereof, can contain esters, such as triglycerides, of various unsaturated fatty acids. The identity and concentration of such fatty acids varies depending on the oil source, and, in some cases, on the variety. In some embodiments, the natural oil comprises one or more esters of oleic acid, linoleic acid, linolenic acid, or any combination thereof. When such fatty acid esters are metathesized, new compounds are formed. For example, in embodiments where the metathesis uses certain short-chain olefins, e.g., ethylene, propylene, or 1-butene, and where the natural oil includes esters of oleic acid, an amount of 1-decene and 1-decenoid acid (or an ester thereof), among other products, are formed. Following transesterification, for example, with an alkyl alcohol, an amount of 9-denenoic acid alkyl ester is formed. In some such embodiments, a separation step may occur between the metathesis and the transesterification, where the alkenes are separated from the esters. In some other embodiments, transesterification can occur before metathesis, and the metathesis is performed on the transesterified product.

In some embodiments, the natural oil can be subjected to various pre-treatment processes, which can facilitate their utility for use in certain metathesis reactions. Useful pre-treatment methods are described in United States Patent Application Publication Nos. 2011/0113679, 2014/0275595, and 2014/0275681, all three of which are hereby incorporated by reference as though fully set forth herein.

In some embodiments, after any optional pre-treatment of the natural oil feedstock, the natural oil feedstock is reacted in the presence of a metathesis catalyst in a metathesis reactor. In some other embodiments, an unsaturated ester (e.g., an unsaturated glyceride, such as an unsaturated triglyceride) is reacted in the presence of a metathesis catalyst in a metathesis reactor. These unsaturated esters may be a component of a natural oil feedstock, or may be derived from other sources, e.g., from esters generated in earlier-performed metathesis reactions. In certain embodiments, in the presence of a metathesis catalyst, the natural oil or unsaturated ester can undergo a self-metathesis reaction with itself.

In some embodiments, the metathesis comprises reacting a natural oil feedstock (or another unsaturated ester) in the presence of a metathesis catalyst. In some such embodiments, the metathesis comprises reacting one or more unsaturated glycerides (e.g., unsaturated triglycerides) in the natural oil feedstock in the presence of a metathesis catalyst. In some embodiments, the unsaturated glyceride comprises one or more esters of oleic acid, linoleic acid, linoleic acid, or combinations thereof. In some other embodiments, the unsaturated glyceride is the product of the partial hydrogenation and/or the metathesis of another unsaturated glyceride (as described above).

The conditions for such metathesis reactions, and the reactor design, and suitable catalysts are as described below with reference to the metathesis of the olefin esters. That discussion is incorporated by reference as though fully set forth herein.

Olefin Metathesis

In some embodiments, one or more of the unsaturated monomers can be made by metathesizing a natural oil or natural oil derivative. The terms "metathesis" or "metathesizing" can refer to a variety of different reactions, including, but not limited to, cross-metathesis, self-metathesis, ring-opening metathesis, ring-opening metathesis polymerizations ("ROMP"), ring-closing metathesis ("RCM"), and acyclic diene metathesis ("ADMET"). Any suitable metathesis reaction can be used, depending on the desired product or product mixture.

In some embodiments, after any optional pre-treatment of the natural oil feedstock, the natural oil feedstock is reacted in the presence of a metathesis catalyst in a metathesis reactor. In some other embodiments, an unsaturated ester (e.g., an unsaturated glyceride, such as an unsaturated triglyceride) is reacted in the presence of a metathesis catalyst in a metathesis reactor. These unsaturated esters may be a component of a natural oil feedstock, or may be derived from other sources, e.g., from esters generated in earlier-performed metathesis reactions. In certain embodiments, in the presence of a metathesis catalyst, the natural oil or unsaturated ester can undergo a self-metathesis reaction with itself.

In some embodiments, the metathesis comprises reacting a natural oil feedstock (or another unsaturated ester) in the presence of a metathesis catalyst. In some such embodiments, the metathesis comprises reacting one or more unsaturated glycerides (e.g., unsaturated triglycerides) in the natural oil feedstock in the presence of a metathesis catalyst. In some embodiments, the unsaturated glyceride comprises one or more esters of oleic acid, linoleic acid, linoleic acid, or combinations thereof. In some other embodiments, the unsaturated glyceride is the product of the partial hydrogenation and/or the metathesis of another unsaturated glyceride (as described above).

The metathesis process can be conducted under any conditions adequate to produce the desired metathesis products. For example, stoichiometry, atmosphere, solvent, temperature, and pressure can be selected by one skilled in the art to produce a desired product and to minimize undesirable byproducts. In some embodiments, the metathesis process may be conducted under an inert atmosphere. Similarly, in embodiments where a reagent is supplied as a gas, an inert gaseous diluent can be used in the gas stream. In such embodiments, the inert atmosphere or inert gaseous diluent typically is an inert gas, meaning that the gas does not interact with the metathesis catalyst to impede catalysis to a substantial degree. For example, non-limiting examples of inert gases include helium, neon, argon, and nitrogen, used individually or in with each other and other inert gases.

The reactor design for the metathesis reaction can vary depending on a variety of factors, including, but not limited to, the scale of the reaction, the reaction conditions (heat, pressure, etc.), the identity of the catalyst, the identity of the materials being reacted in the reactor, and the nature of the feedstock being employed. Suitable reactors can be designed by those of skill in the art, depending on the relevant factors, and incorporated into a refining process such, such as those disclosed herein.

The metathesis reactions disclosed herein generally occur in the presence of one or more metathesis catalysts. Such methods can employ any suitable metathesis catalyst. The metathesis catalyst in this reaction may include any catalyst or catalyst system that catalyzes a metathesis reaction. Any known metathesis catalyst may be used, alone or in combination with one or more additional catalysts. Examples of metathesis catalysts and process conditions are described in US 2011/0160472, incorporated by reference herein in its entirety, except that in the event of any inconsistent disclosure or definition from the present specification, the disclosure or definition herein shall be deemed to prevail. A number of the metathesis catalysts described in US 2011/0160472 are presently available from Materia, Inc. (Pasadena, Calif.).

In some embodiments, the metathesis catalyst includes a Grubbs-type olefin metathesis catalyst and/or an entity derived therefrom. In some embodiments, the metathesis catalyst includes a first-generation Grubbs-type olefin metathesis catalyst and/or an entity derived therefrom. In some embodiments, the metathesis catalyst includes a second-generation Grubbs-type olefin metathesis catalyst and/or an entity derived therefrom. In some embodiments, the metathesis catalyst includes a first-generation Hoveyda-Grubbs-type olefin metathesis catalyst and/or an entity derived therefrom. In some embodiments, the metathesis catalyst includes a second-generation Hoveyda-Grubbs-type olefin metathesis catalyst and/or an entity derived therefrom. In some embodiments, the metathesis catalyst includes one or a plurality of the ruthenium carbene metathesis catalysts sold by Materia, Inc. of Pasadena, Calif. and/or one or more entities derived from such catalysts. Representative metathesis catalysts from Materia, Inc. for use in accordance with the present teachings include but are not limited to those sold under the following product numbers as well as combinations thereof: product no. C823 (CAS no. 172222-30-9), product no. C848 (CAS no. 246047-72-3), product no. C601 (CAS no. 203714-71-0), product no. C627 (CAS no. 301224-40-8), product no. C571 (CAS no. 927429-61-6), product no. C598 (CAS no. 802912-44-3), product no. C793 (CAS no. 927429-60-5), product no. C801 (CAS no. 194659-03-9), product no. C827 (CAS no. 253688-91-4), product no. C884 (CAS no. 900169-53-1), product no. C833 (CAS no. 1020085-61-3), product no. C859 (CAS no. 832146-68-6), product no. C711 (CAS no. 635679-24-2), product no. C933 (CAS no. 373640-75-6).

In some embodiments, the metathesis catalyst includes a molybdenum and/or tungsten carbene complex and/or an entity derived from such a complex. In some embodiments, the metathesis catalyst includes a Schrock-type olefin metathesis catalyst and/or an entity derived therefrom. In some embodiments, the metathesis catalyst includes a high-oxidation-state alkylidene complex of molybdenum and/or an entity derived therefrom. In some embodiments, the metathesis catalyst includes a high-oxidation-state alkylidene complex of tungsten and/or an entity derived therefrom. In some embodiments, the metathesis catalyst includes molybdenum (VI). In some embodiments, the metathesis catalyst includes tungsten (VI). In some embodiments, the metathesis catalyst includes a molybdenum- and/or a tungsten-containing alkylidene complex of a type described in one or more of (a) Angew. Chem. Int. Ed. Engl., 2003, 42, 4592-4633; (b) Chem. Rev., 2002, 102, 145-179; and/or (c) Chem. Rev., 2009, 109, 3211-3226, each of which is incorporated by reference herein in its entirety, except that in the event of any inconsistent disclosure or definition from the present specification, the disclosure or definition herein shall be deemed to prevail.

In certain embodiments, the metathesis catalyst is dissolved in a solvent prior to conducting the metathesis reaction. In certain such embodiments, the solvent chosen may be selected to be substantially inert with respect to the metathesis catalyst. For example, substantially inert solvents include, without limitation: aromatic hydrocarbons, such as benzene, toluene, xylenes, etc.; halogenated aromatic hydrocarbons, such as chlorobenzene and dichlorobenzene; aliphatic solvents, including pentane, hexane, heptane, cyclohexane, etc.; and chlorinated alkanes, such as dichloromethane, chloroform, dichloroethane, etc. In some embodiments, the solvent comprises toluene.

In other embodiments, the metathesis catalyst is not dissolved in a solvent prior to conducting the metathesis reaction. The catalyst, instead, for example, can be slurried with the natural oil or unsaturated ester, where the natural oil or unsaturated ester is in a liquid state. Under these conditions, it is possible to eliminate the solvent (e.g., toluene) from the process and eliminate downstream olefin losses when separating the solvent. In other embodiments, the metathesis catalyst may be added in solid state form (and not slurried) to the natural oil or unsaturated ester (e.g., as an auger feed).

The metathesis reaction temperature may, in some instances, be a rate-controlling variable where the temperature is selected to provide a desired product at an acceptable rate. In certain embodiments, the metathesis reaction temperature is greater than –40° C., or greater than –20° C., or greater than 0° C., or greater than 10° C. In certain embodiments, the metathesis reaction temperature is less than 200° C., or less than 150° C., or less than 120° C. In some embodiments, the metathesis reaction temperature is between 0° C. and 150° C., or is between 10° C. and 120° C.

EXAMPLES

Materials

The materials used in the following examples were obtained from the following sources. Methyl 9-decenoate (9-DAME) was obtained from Elevance Renewable Sciences, Inc. and used as received. Formic acid (FA; 97%) and potassium hydroxide (KOH; 85%) were obtained from Alfa Aesar and used as received. Dibutyltin oxide (SnOBu$_2$; 98%), antimony(III) oxide (Sb$_2$O$_3$; 99%; 5 micron powder), meta-chloroperoxybenzoic acid (m-CPBA, ≤77%), sodium hydroxide solution (NaOH, 1.0 M in water), magnesium sulfate (MgSO$_4$, 99%) sodium sulfite (NaSO$_3$, ≥98%), sodium bicarbonate (NaHCO$_3$, ≥99.7), N-methyl-2-pyrrolidone (NMP, ACS grade), and sodium chloride (NaCl, ≥99%) were obtained from Sigma Aldrich and used as received. A titanium tetraisopropoxide catalyst solution (Ti(OiPr)$_4$; 0.01 g Ti/mL) was prepared in anhydrous 1-butanol (99.8%; Sigma Aldrich) according to the procedure set forth in Kang et al., Macromolecules, vol. 35, p. 8738 (2002). Hydrochloric acid (HCl) and isopropanol (IPA) were purchased from Spectrum Chemicals and used as received. Dichloromethane (DCM) was obtained from Fisher Scientific and used as received. All water used was purified using a reverse osmosis process.

Example 1

Monomer Synthesis

9-DAME (20 g) and formic acid (50 mL) were added to a 250 mL round bottomed flask equipped with a magnetic stir bar and water condenser. The reaction setup was lowered into an oil bath and allowed to reflux (~90° C.) with constant stirring for at least 24 hours. The condenser was then removed and the reaction was equipped with a distillation apparatus and excess formic acid removed via vacuum distillation. The temperature of the oil bath was then lowered to approximately 60° C. and KOH in a mixture of water and IPA was added to the reaction and allowed to stir for a minimum of 3 hours. The reaction mixture was pushed through a basic alumina column and excess solvent removed using rotary evaporation. A clear yellow oil was obtained and dried in the vacuum oven overnight. Proton ($^1$H) NMR was used to determine monomer structure and the isomeric mixture. Formylate-ester product often remained after the aforementioned workup and was determined based on the distinct proton ($^1$H) NMR resonance of the aldehyde proton around 8 ppm. To deformylate, the oil was dissolved in IPA and KOH in IPA/water was added to the reaction and allowed to stir at 60° C. It was determined that vigorous stirring aided in deformylation. The reaction mixture was neutralized using an aqueous HCl solution. To reduce impurities, one batch of product was extracted into DCM multiple times and the solvent removed using a rotary evaporator. To remove salt remaining in the oil, the extracted batch of product was filtered through a 5 μm membrane filter. Depending on the monomer batch/purity, a silica or basic alumina flash column was performed. Finally, the product was dried in the vacuum oven at c.a. 50° C. The neutralization and isolation procedure was repeated as needed to remove formate ester and obtain an isomeric mixture, generated from 1,2-hydride shifts, of an AB monomer. Workup conditions influenced the structure of the obtained product(s) and are discussed in detail in the results and discussion section. One monomer batch resulted in an isomeric mixture of AB hydroxyesters (LC/MS). AB hydroxyesters: methyl 9-hydroxydecanoate, methyl 8-hydroxydecanoate, methyl 7-hydroxydecanoate. LC/MS [M+H]=203.04. Masses corresponding to formate ester, dimers, and starting material were also observed.

A different monomer batch provided an isomeric mixture of AB hydroxyesters and AB hydroxyester dimers of 7-hydroxydecanoic acid, 8-hydroxydecanoic acid, and 9-hydroxydecanoic acid. LC/MS [M+H]=189.11 and 359.27; TOF-MS=358.27.

Example 2

Melt Transesterification of Monomer

1 Gram of the isomeric mixture of AB hydroxy-ester (methyl 9-hydroxydecanoate, methyl 8-hydroxydecanoate, and methyl 7-hydroxydecanoate) was added to a dry 50-mL round-bottomed flask. Approximately 600 ppm dibutyltin oxide (0.0013 g) was added to the reaction and the round-bottomed flask equipped with a mechanical stirrer and distillation apparatus through a t-neck adapter which also provided a $N_2$ inlet. The reaction setup was purged with $N_2$ and evacuated at least three times to ensure complete oxygen removal. The reaction was then lowered into a silicon oil bath heated to ca. 80° C. and allowed to react for approximately 2 hours with continuous stirring and $N_2$ purge. The temperature was increased to 120° C. for another 2 hours, then 170° C. and 200° C. each for 1 hour. High vacuum (<0.15 mmHg) was then applied and the reaction continued for another 2 hours at 200° C. The resulting transparent liquid polymer was removed from the round-bottomed flask and characterized without any further workup or purification.

Example 3

Polycondensation of Monomer 0.5 Gram of the isomeric mixture of AB hydroxyacid (9-hydroxydecanoic acid, 8-hydroxydecanoic acid, and 7-hydroxydecanoic acid) was added to a dry 50-mL round-bottomed flask. A mechanical stirrer and distillation apparatus were attached through a t-neck, providing a $N_2$ inlet. The reaction setup was then purged with $N_2$ and evacuated at least three times to remove any oxygen. The reaction was lowered into a silicon oil bath heated to ca. 80° C. and allowed to react with stirring under a $N_2$ purge for ~4.5 hours. The reaction temperature was then increased to ~130° C. and polymerization continued for another 7.5 hours. The reaction temperature was increased to ~200° C. for an additional ~12 hours and then vacuum (<0.15 mmHg) applied while at 200° C. for 6 hours. The resulting transparent liquid polymer was removed from the round-bottomed flask and characterized without any further purification.

Example 4

Determination Molecular Weight and Glass Transition Temperature

Polyester polymers were made according to Example 3 using the following polymerization times: 6.5 hours, 8.0 hours, 9.5 hours, and 12.5 hours. The following properties were determined for the polymers obtained: number-average molecular weight ($M_n$), weight-average molecular weight ($M_w$), and the glass transition temperature ($T_g$). The results are shown in Table 1 below.

TABLE 1

| Polymerization Time (h) | $M_n$ (g/mol) | $M_w$ (g/mol) | $T_g$ (° C.) |
|---|---|---|---|
| 6.5 | | | −70 |
| 8.0 | 6566 | 10964 | −59 |
| 9.5 | 7673 | 12547 | −60 |
| 12.5 | 9566 | 16126 | −60 |

What is claimed is:

1. A polyester polymer, which comprises constitutional units formed from a reaction mixture comprising a first monomer, a second monomer, and a third monomer, each of Formula (I):

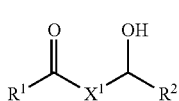

wherein:
the first monomer is a compound of Formula (I) where $R^2$ is methyl, $X^1$ is —$(CH_2)_7$—, $R^1$ is —OH or —$OR^3$, and $R^3$ is $C_{1-6}$ alkyl or $C_{1-6}$ oxyalkyl;
the second monomer is a compound of Formula (I) where $R^2$ is ethyl, $X^1$ is —$(CH_2)_6$—, $R^1$ is —OH or —$OR^3$, and $R^3$ is $C_{1-6}$ alkyl or $C_{1-6}$ oxyalkyl; and
the third monomer is a compound of Formula (I) where $R^2$ is n-propyl, $X^1$ is —$(CH_2)_5$—, $R^1$ is —OH or —$OR^3$, and $R^3$ is $C_{1-6}$ alkyl or $C_{1-6}$ oxyalkyl.

2. The polyester polymer of claim 1, wherein $R^1$ is —OH.

3. The polyester polymer of claim 1, wherein $R^1$ is —$OR^3$.

4. The polyester polymer of claim 1, which comprises constitutional units formed from the first monomer and the second monomer.

5. The polyester polymer of claim 1, which comprises constitutional units formed from the first monomer and the third monomer.

6. The polyester polymer of claim 1, which comprises constitutional units formed from the second monomer and the third monomer.

7. The polyester polymer of claim 1, which comprises constitutional units formed from the first monomer, the second monomer, and the third monomer.

8. The polyester polymer of claim 1, which is an AB-type polymer.

9. The polyester polymer of claim 1, wherein the polyester polymer is amorphous.

10. The polyester polymer of claim 1, wherein the reaction mixture further comprises one or more diols.

11. The polyester polymer of claim 10, wherein the one or more diols are selected from the group consisting of ethylene glycol, 1,2-propylene glycol, 1,3-propylene glycol, 1,4-butanediol, 2,3-butanediol, 1,5-pentanediol, 1,6-hexanediol, 1,8-octanediol, 2-methyl-1,3-propanediol, 2-butyl-2-ethyl-1,3-propanediol, and neopentyl glycol.

12. The polyester polymer of claim 1, wherein the reaction mixture further comprises one or more diacids, or esters thereof.

13. The polyester polymer of claim 12, wherein the one or more diacids, or esters thereof, are selected from the group consisting of oxalic acid, malonic acid, succinic acid, glutaric acid, adipic acid, pimelic acid, suberic acid, azelaic acid, sebacic acid, 1,12-dodecanedioic acid, 1,14-tetradecanedioic acid, 1,16-hexadecanedioic acid, 1,18-octadecanedioic acid, 1,20-eicosanedioic acid, 1,22-docosanedioic acid, 1,18-octadec-9-enedioic acid, and esters of any of the foregoing.

14. The polyester polymer of claim 1, wherein the reaction mixture further comprises one or more hydroxy acids, or esters thereof.

15. The polyester polymer of claim 14, wherein the one or more hydroxy acids, or esters thereof, are selected from the group consisting of α-hydroxy acids, β-hydroxy acids, ω-hydroxy acids, and esters of any of the foregoing.

16. The polyester polymer of claim 1, wherein the reaction mixture further comprises one or more branching agents.

17. The polyester polymer of claim 1, wherein the reaction mixture further comprises one or more cross-linking agents.

* * * * *